(12) United States Patent
Bjerknes et al.

(10) Patent No.: US 9,964,249 B2
(45) Date of Patent: May 8, 2018

(54) LONG STEP OUT DIRECT ELECTRIC HEATING ASSEMBLY

(71) Applicant: Aker Subsea AS, Lysaker (NO)

(72) Inventors: Ole Johan Bjerknes, Oslo (NO); Ole A. Heggdal, Finstadjordet (NO)

(73) Assignee: Aker Solutions AS, Lysaker (NO)

( * ) Notice: Subject to any disclaimer, the term of this patent is extended or adjusted under 35 U.S.C. 154(b) by 622 days.

(21) Appl. No.: 14/376,198

(22) PCT Filed: Feb. 19, 2013

(86) PCT No.: PCT/EP2013/053272
§ 371 (c)(1),
(2) Date: Aug. 1, 2014

(87) PCT Pub. No.: WO2013/124270
PCT Pub. Date: Aug. 29, 2013

(65) Prior Publication Data
US 2014/0376900 A1 Dec. 25, 2014

(30) Foreign Application Priority Data
Feb. 21, 2012 (NO) .................... 20120180

(51) Int. Cl.
*F24H 1/10* (2006.01)
*F16L 53/00* (2018.01)
(Continued)

(52) U.S. Cl.
CPC ........... *F16L 53/004* (2013.01); *F16L 53/007* (2013.01); *F24H 9/00* (2013.01); *H05B 3/023* (2013.01); *H05B 3/82* (2013.01); *H05B 2214/03* (2013.01)

(58) Field of Classification Search
CPC ......... F16L 53/004; F16L 53/007; F24H 9/00; H05B 3/023; H05B 3/82
(Continued)

(56) References Cited

U.S. PATENT DOCUMENTS 3,755,650 A 8/1973 Ando
4,704,515 A 11/1987 Offermann
(Continued)

FOREIGN PATENT DOCUMENTS

DE 102008056089 A1 7/2010
EP 2166637 A1 3/2010
(Continued)

OTHER PUBLICATIONS

Martin, Gea Haupt, "International Search Report," prepared for PCT/EP2013/053272, dated Jul. 3, 2013, three pages.
(Continued)

*Primary Examiner* — Dana Ross
*Assistant Examiner* — Joseph Iskra
(74) *Attorney, Agent, or Firm* — Winstead PC

(57) ABSTRACT

A subsea direct electrical heating assembly adapted to heat a hydrocarbon conducting steel pipeline (1) arranged subsea. The assembly comprises a direct electrical heating cable (3) extending along and being connected to the steel pipeline (1) and a power transmission cable (7) receiving electric power from a power supply (5) which is arranged onshore or at surface offshore, and which feeds the direct electrical heating cable (3). The subsea direct electrical heating assembly comprises a power conditioning arrangement (100) arranged at a subsea location, in a position between the power transmission cable (7) and the direct electrical heating cable (3). The power transmission cable (7) extends from the offshore or onshore power supply (5) and down to the power conditioning arrangement (100).

15 Claims, 14 Drawing Sheets

(51) Int. Cl.
*H05B 3/02* (2006.01)
*F24H 9/00* (2006.01)
*H05B 3/82* (2006.01)

(58) Field of Classification Search
USPC ........................................................ 392/480
See application file for complete search history.

(56) References Cited

U.S. PATENT DOCUMENTS

| | | | |
|---|---|---|---|
| 6,166,359 A * | 12/2000 | Cruickshank | B23K 9/235 |
| | | | 219/607 |
| 6,278,095 B1 | 8/2001 | Bass et al. | |
| 6,371,693 B1 * | 4/2002 | Kopp | F16L 53/007 |
| | | | 137/341 |
| 1,309,990 A1 | 12/2011 | Parsche | |
| 9,429,263 B2 | 8/2016 | Lervik et al. | |
| 2008/0232681 A1 * | 10/2008 | Bornes et al. | E21B 36/04 |
| | | | 166/61 |
| 2010/0101663 A1 | 4/2010 | Granborg | |
| 2015/0016812 A1 | 1/2015 | Radan et al. | |
| 2015/0048079 A1 | 2/2015 | Heggdal et al. | |

FOREIGN PATENT DOCUMENTS

| | | |
|---|---|---|
| WO | WO-2006075913 A1 | 7/2006 |
| WO | WO-2007011230 A1 | 1/2007 |
| WO | WO-2010135772 A1 | 12/2010 |

OTHER PUBLICATIONS

Hutter, Manfred, "International Search Report," prepared for PCT/EP2013/053086, dated Jul. 18, 2013, four pages.

\* cited by examiner

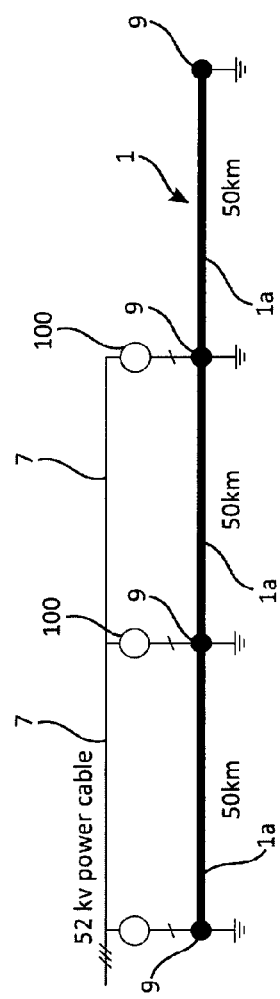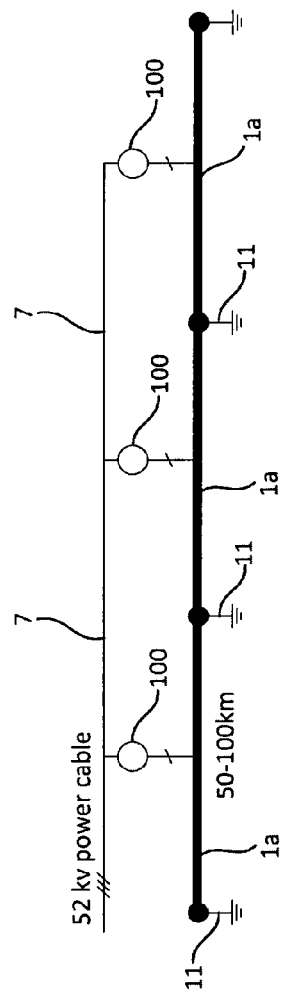

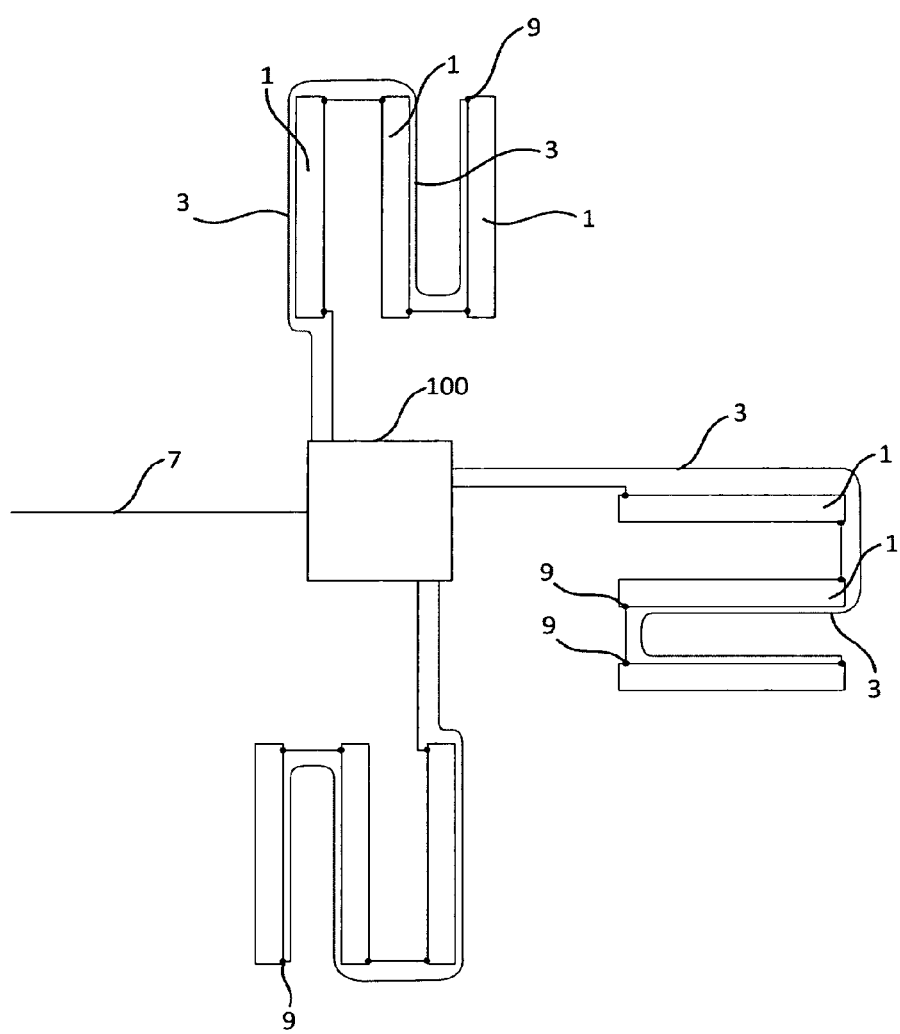

LONG STEP OUT DIRECT ELECTRIC HEATING ASSEMBLY

The present invention relates to heating of long subsea flowlines conducting hydrocarbons and long distance power supply via subsea cables. In particular it relates to the method known in the art as direct electric heating, wherein electric power is used to heat the pipelines in order to prevent hydrate formation. The assembly is particularly suitable for hydrate/wax prevention in long step-out flowlines by direct electric heating of e.g. 10" to 30" carbon pipelines in the range of e.g. 60-300 km or more.

BACKGROUND

Direct electric heating (DEH) of long flowlines and large export pipelines provides many advantages compared to alternative methods. DEH has been applied actively in the past 10 years to prevent hydrate formation and is now breaking new ground that was not previously being considered feasible. By using qualified technology and existing design models, longer and larger pipelines can be heated intermittently or continuously.

Direct Electrical Heated Pipe in Pipe (DEHPIP) is a slightly different technological approach to the same problem that have quite similar demands for the electrical power supply system to drive them, hence most of the electrical energy supply system topologies can be used to power both DEH and DEHPIP systems independent of end-fed or mid-point fed topologies. Common for both systems is that the electric current flows axially through the pipe wall causing direct heating of the pipeline.
Wet-insulated: Open Loop System
  End-Fed Pipe
  Center-Fed Pipe
Dry-insulated: Closed Loop System
  End-Fed Pipe-in-Pipe
  Center-Fed Pipe-in-Pipe DEHPIP systems are sometimes described as Electrical Flowline Heating (EFH) systems since EFH systems traditionally have been associated with the Dry Insulated (Pipe-in-Pipe) flowline heating system technology, but the term can also be used as a general reference to any flowline heating using electricity.

Electric Heating of Pipelines is attractive for short and long step outs as DEH operating costs are considerably reduced compared to the use of chemicals. The technology is unique and commercially and technically attractive. It allows for the use of DEH for both infield flowlines, tie-backs and export pipelines with diameters around 6" to 30" and above. An increased number of DEH assemblies has been evaluated for oil and gas fields or project developments concepts around the world and the extension of this new technology will generally give higher flexibility in operation of the fields during planned or unplanned shut downs. Material aging and other failure mechanisms caused by high temperatures and water pressure are also of great importance. Accuracy in design and analysis as well as industry experience are important in solving project specific hydrate or wax issues in long DEH systems.

Using DEH can involve arranging a DEH cable along a steel pipeline. Current is guided through the DEH cable in one direction and returned through the pipeline steel in the return direction. Heat is generated in the pipeline steel, partly due to ohmic resistance in the steel and partly due to induced heat, as the current is an alternating current. As the contact between the DEH cable and the pipeline steel is not insulated from the surrounding sea water, a fraction of the current will also flow through the sea water and not in the pipeline.

Patent application publication EP2166637 (Siemens Aktiengesellschaft) describes a power supply arrangement for direct electrical heating (DEH) of a pipeline system. The power supply arrangement has a three phase transformer and a compensation unit including a capacitor means, and is adapted to feed electrical power to a single phase load.

WO2007011230 (Aker Kværner Engineering & Technology) describes a system for power supply to a flowline heating circuit. An electric distribution cable (3) is connected to the system, which extends to the subsea located pipeline (4) which is to be heated. In a subsea location there are arranged 3-to-2 phase transformers which connect electric power from a supply cable to sections of "piggyback" cables strapped onto the heated pipeline.

WO2006075913 describes a system for power supply to subsea installations, comprising electric power supply cables for DEH of a pipeline. The system is configurable to provide 3-phase power supply to an electric motor arranged subsea, when not heating the pipeline.

THE INVENTION

According to the invention there is provided a subsea direct electrical heating assembly adapted to heat a hydrocarbon conducting steel (typically pipe-walls with ferromagnetic or similar material properties) pipeline arranged subsea. The assembly comprises a direct electrical heating cable (DEH cable) extending along and being connected to the steel pipeline and a power transmission cable adapted to receive electric power from a power supply, arranged onshore or at surface offshore, and to feed the direct electrical heating cable. According to the invention the subsea direct electrical heating assembly further comprises a power conditioning arrangement arranged at a subsea location, in a position between the power transmission cable and the direct electrical heating cable, wherein the power transmission cable extends from the offshore or onshore power supply and down to the power conditioning arrangement.

The power transmission cable should be understood to mean any cable or plurality of cables that transport electric power from an offshore topside or onshore location to the subsea location of the power conditioning arrangement. It should be understood that the power transmission cable also could receive electric power via another subsea unit, such as a power distribution unit arranged subsea.

The power conditioning arrangement can advantageously comprise a subsea capacitor arrangement. Since the DEH cable combined with the pipeline that shall be heated constitute an inductive load, the use of a capacitor arrangement will adapt delivered power to fit the load. That is, the power factor will be adjusted to balance the inductive load with the power supply. As a result, the cross section of the power transmission cable can be reduced compared to prior art solutions, in which power conditioning was performed onshore or on a floating installation, far away from the load.

The power conditioning arrangement can also comprise a transformer. The power conditioning arrangement can also comprise a reactor.

The direct electrical heating cable is preferably arranged along and attached to the pipeline. A person skilled in the art knows this method as the piggyback solution.

A piggyback solution can also be used for a subsea power cable independent of DEH or EFH. I.e. a power cable can, during pipe laying or before trenching, be strapped to a hydrocarbon or produced-water or injection-water transfer pipeline, to establish an electrical interconnection between two offshore installations or between onshore and offshore installations. For long interconnections of this type or similar ones without DEH a subsea reactor is suitable to overcome some of reactive power flow challenges associated with critical cable lengths and transmission losses for high voltage ac-power cables.

In an embodiment according to the present invention, the subsea direct electric heating assembly is adapted to heat a plurality of pipeline sections which each constitutes a part of a longer pipeline. In this embodiment the assembly comprises a plurality of DEH cables arranged along and/or in proximity to the pipeline sections. For each pipeline section a said power conditioning arrangement is arranged between the power transmission cable and the section heating cables associated to each pipeline section.

In one embodiment, power from the power transmission cable is fed to a direct electrical heating cable adapted to heat a pipeline extending between a subsea well and a subsea compression facility, through the subsea power conditioning arrangement.

The subsea capacitor arrangement can be in the kV and kVAr range or above. Preferably the capacitor arrangement comprises a capacitor element arranged within a tank that prevents sea water entering the tank and getting into contact with the capacitor arrangement. The tank is preferably pressure balanced and filled with a pressure compensation fluid.

On or off load tap-changer or tuning arrangements can be arranged in combination with a magnetic gear in order to enable operation without penetration of a metallic water barrier of the subsea capacitor unit's tank or housing.

Also, the transformer is preferably arranged within the same tank.

The on or off load tap-changer or tuning arrangements can be adjusted by ROV operations or an electric or a hydraulic actuator as typically used for subsea valve operations.

The capacitor arrangement is preferably a variable capacitor arrangement. The capacitance can then be adjustable between an upper and lower value, preferably by means of an actuator arranged within the tank. In this embodiment the operator is able to condition the delivered power to the load after installing the power conditioning arrangement, i.e. tuning of the DEH loops or enhanced power level control.

Correspondingly, the transformer can be an adjustable transformer for tuning of DEH loops or enhanced power level control.

One embodiment of an adjustable transformer is a transformer equipped with an on or off load tap-changer arrangement preferably capable of a +/−30% voltage control range or more.

A second embodiment of an adjustable transformer is a transformer equipped with an on load magnetic-field control arrangement preferably capable of a +/−30% voltage control range or more, i.e. an adjustable air-gap or a Controllable Inductance Transformer.

Optionally one or more of the transformer out-put terminals can be equipped with series reactors that can be tapped or short circuited in order to step the output current.

Alternatively to adjustable transformers, solutions with semiconductor based power electronics can be used to limit the voltage applied on a section with DEH or EFH, i.e. typically thyristors in anti-parallel, transistors or other arrangements that can be operated in similar manners as a soft-starter for continuous operation. The semiconductors can be pressurized or located in a one atmosphere pressure controlled chamber associated with or within the pressure compensated transformer tank/housing or the tank of the power conditioning arrangement.

The above methods for tuning of DEH loops or enhanced EFH power level control can generally be applied for power conditioning embodiments with single phase transformers, 3-to-2-phase transformers (typically Scott or Le Blanc connected) or 3-to-4-phase transformers, but some will be better suited than others for specific solutions.

In an advantageous embodiment the power transmission cable comprises three phases and three section heating cables are each connected between two different pairs of phases of the power transmission cable. In one variation of this embodiment, the assembly comprises three sets of section heating cables, wherein each set comprises two or more section cables. A section heating cable is a DEH cable adapted to heat a pipeline section. This will be described below with reference to the drawings.

Parallel pipelines or U-shaped return-pig-able flow lines or infield lines could have parallel pipe sections with DEH applied separately with dedicated piggyback cables on each parallel pipe section powered via a three-to-two phase transformers or three-to-four phase transformers.

In an end-fed embodiment the power conditioning arrangement can be connected between the power transmission cable and an end-fed pipeline section. One transformer phase exits the tank through penetrator(s) and is connected to respective remote-end of said pipeline section. Furthermore, a second transformer terminal is connected to a section near-end connection cable that connects to a near-end on the pipeline section between said respective ends. The section near-end connection cable is short-circuited to a steel structure of the power conditioning arrangement as is also the second transformer terminal. The steel structure can for instance be the tank structure.

In a midpoint embodiment the power conditioning arrangement can be connected between the power transmission cable and a midpoint fed pipeline section. Two transformer phases exit the tank through penetrators and are connected to respective ends of said pipeline section. Furthermore, a third transformer terminal is connected to a section midpoint connection cable that connects to a midpoint on the pipeline section between said respective ends. The section midpoint connection cable is short-circuited to a steel structure of the power conditioning arrangement as is also the third transformer terminal. The steel structure can for instance be the tank structure.

In one particular embodiment the power conditioning arrangement is connected to a plurality of DEH cables which are arranged along different pipelines.

In another but somewhat similar embodiment the power conditioning arrangement is connected to a plurality of sets of a plurality of DEH cables, wherein each set is arranged to heat a plurality of separate pipelines.

In the embodiments according to the present invention, the power transmission cable can extend for instance at least 30 km between the power supply and said power conditioning arrangement.

With the term direct electric heating cable (DEH cable) is meant a cable provided with alternating electric current in order to heat a subsea pipeline adapted to carry hydrocarbons. In the art this comprises solutions known as direct electric heating.

EXAMPLE OF EMBODIMENT

While the invention has been described in general terms above, a more detailed example of embodiment will be given in the following with reference to the drawings, in which FIG. 1 is a principle sketch of a subsea pipeline being heated with a direct electrical heating assembly which is powered from a floating surface installation;

FIG. 7 is a schematic view of an end fed DEH assembly comprising a plurality of heating cable sections;

FIG. 8 is a schematic view of a midpoint fed DEH assembly comprising a plurality of heating cable sections;

Figure 18:
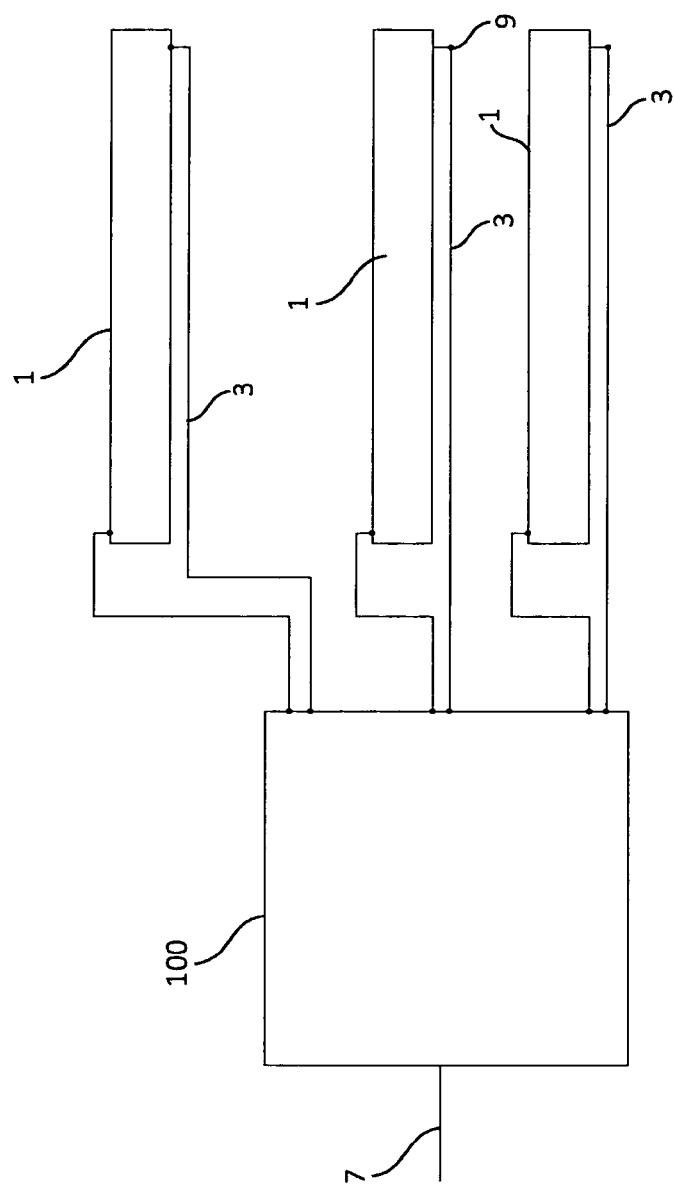

FIG. 18 is a schematic view of a DEH assembly according to the invention, wherein different pipes are heated with DEH cables which are fed from the same power conditioning arrangement; and FIG. 19 is a schematic view of a DEH assembly according to the invention, wherein a plurality of sets with parallel extending pipelines are provided with DEH cables fed from a common power conditioning arrangement.

Figure 1:
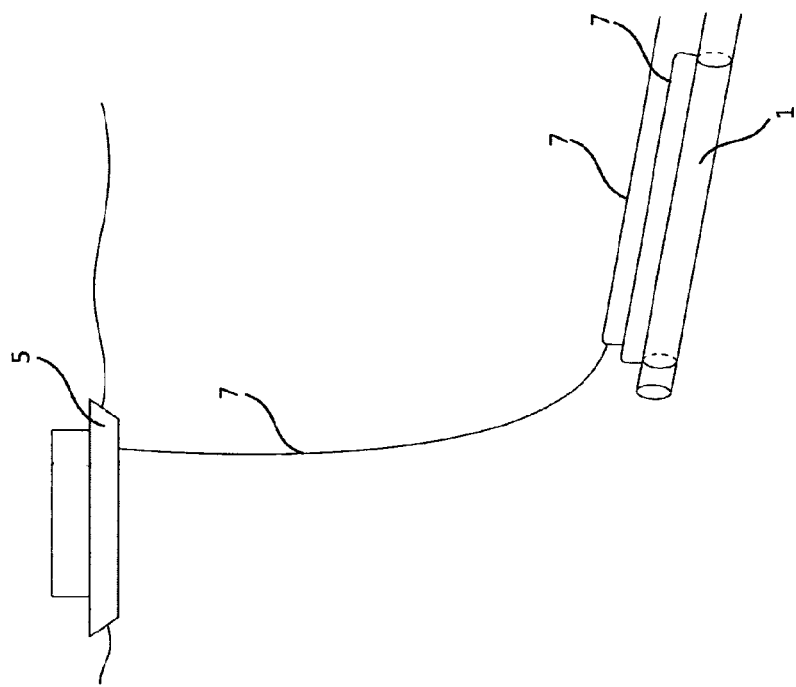

FIG. 1 shows a part of a hydrocarbon conducting pipeline 1 arranged on the seabed. Along a section of the pipeline 1 is a direct electrical heating cable (DEH cable) 3. The DEH cable 3 connects to the said section of the pipeline 1 in two locations and provides that alternating electric current flows through the steel of the pipeline 1, between the said locations. At the locations of electric contact between the DEH cable 3 and the steel of the pipeline 1, there is also contact to the ambient sea water. Thus, some current will flow through the sea water, along the pipeline.

Between the DEH cable 3 and a power supply arranged on a floating installation 5 extends a power transmission cable 7. It is also known to provide power through a power transmission cable 7 from an onshore location.

Figure 2:
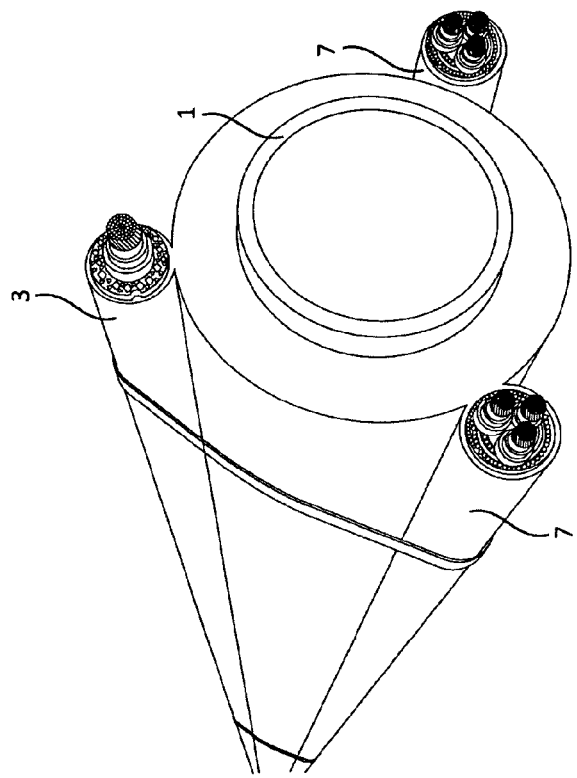
FIG. 2 is a perspective view of a thermally insulated steel pipe having a direct electrical heating cable and two power transmission cables strapped onto it.

FIG. 2 is a perspective cutaway view of the pipeline 1. Onto the pipeline 1 there are strapped one DEH cable 3 and two power transmission cables 7. This technique is known in the art as piggyback cabling. It should be noted that the power transmission cables 7 shown strapped onto the pipeline 1 in FIG. 2 are not necessarily used to feed power to the DEH cable 3. I.e. they may be used to feed other DEH cables than the one shown, or to feed other subsea equipment.

On the steel section of the pipeline 1 there is arranged thermal insulation. This reduces the heat loss to the ambient sea water when the steel is heated.

Figure 3:
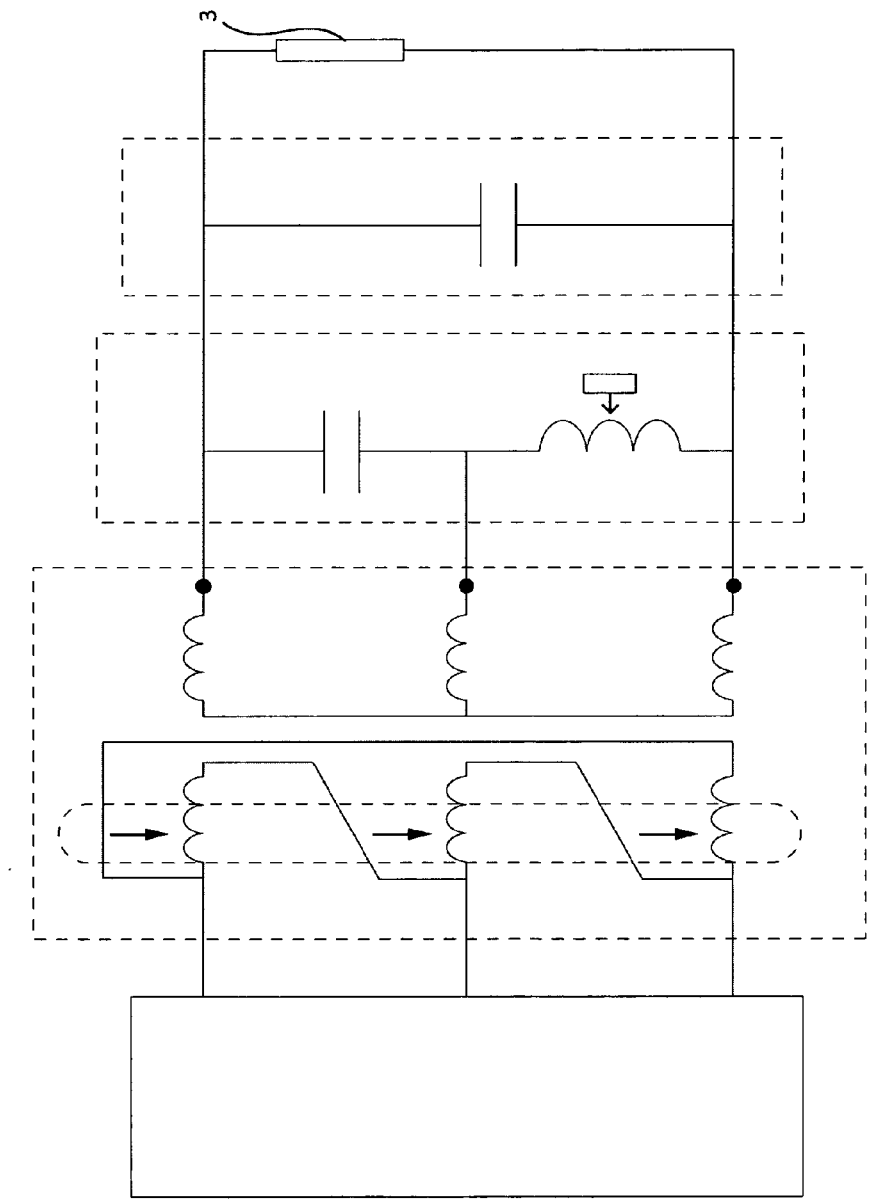
FIG. 3 is a schematic drawing showing a setup from the prior art, showing a power supply arrangement arranged at a surface or onshore location.

FIG. 3 is a schematic drawing showing a setup from the prior art, namely the patent application publication EP2166637. The drawing shows a power supply arrangement adapted to provide electric current to a DEH cable arranged subsea, such as the DEH cable 3.

Figure 4:
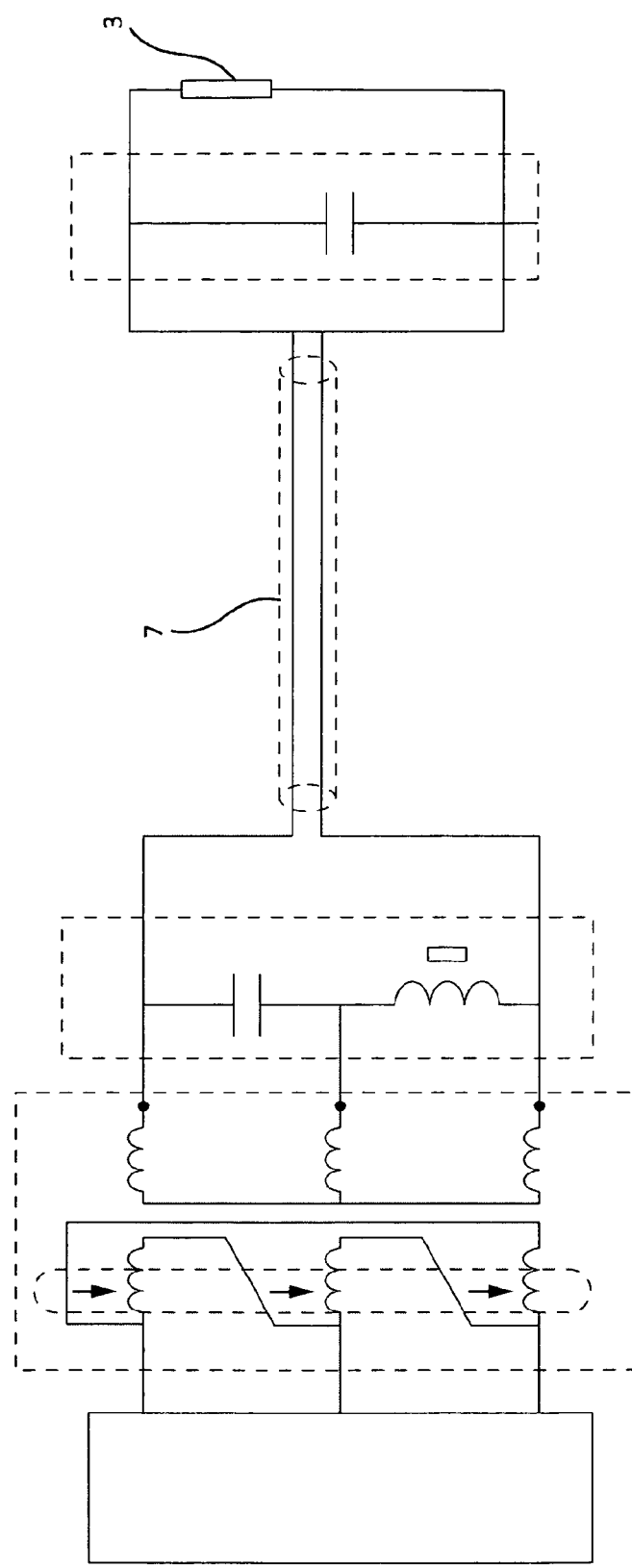
FIG. 4 is a schematic drawing of the same features as shown in FIG. 3, however with a power transmission cable arranged between a subsea capacitor arrangement and the remaining components of the power supply arrangement.

FIG. 4 is a modification of the drawing shown in FIG. 3, according to an embodiment of the present invention. In this embodiment, the capacitor arrangement which is arranged before the DEH cable 3, is arranged at a subsea location, close to the DEH cable 3. As a result of this, a power transmission cable 7 is arranged between the DEH cable 3 and the other parts of the power supply. As illustrated in FIG. 1, the power transmission cable 7 extends from a surface location (or an onshore location) down to the DEH cable 3.

Figure 5:
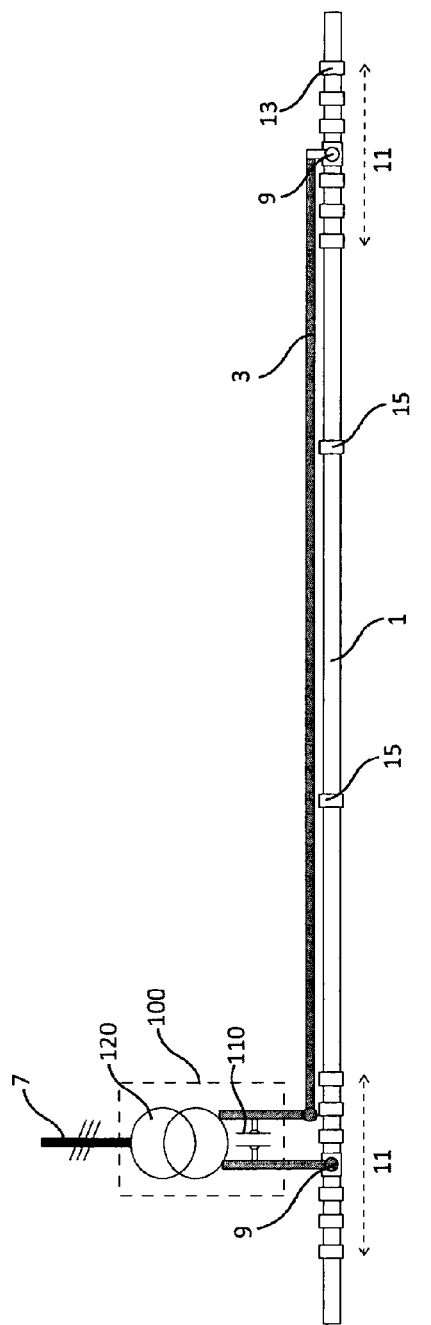
FIG. 5 is a schematic view of an end fed DEH assembly according to the present invention.
Figure 6:
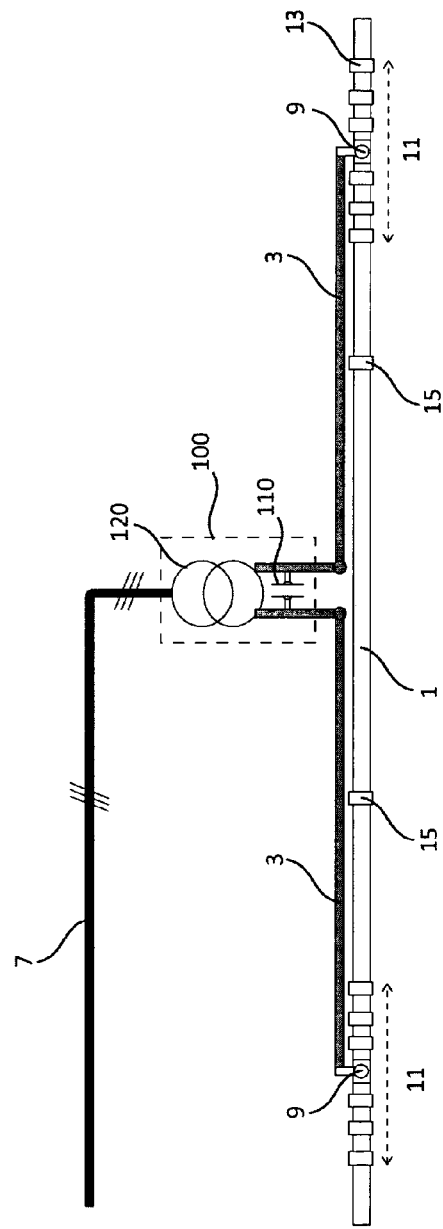
FIG. 6 is a schematic view of a midpoint fed DEH assembly according to the present invention.

FIG. 5 and FIG. 6 show two types of setup for a DEH assembly according to the present invention. In these embodiments, as well as for additional embodiments to be described later with reference to additional drawings, it is assumed a carbon steel pipeline of 30", and power transmission cables of 52 kV. It should however be clear to the person skilled in the art that the invention is not limited to these constraints. Thus the pipeline diameter may be smaller or larger, and power transmission cables of higher or lower voltage may be employed, for instance 132 kV. In 2011 the upper limit for electrical subsea connectors or penetrators recognized by the industry was 132 (145) kV, ref. Mecon DM 145 kV. Furthermore, the embodiments described herein are not restricted to use at deep waters, such as 1000 to 2000 meters. However the described embodiments according to the invention are well suited for such depths.

In the embodiment shown in FIG. 5, approximately 50 km of thermally insulated pipeline 1 is heated with a DEH assembly according to the invention. From a not shown power supply, which for instance can be arranged on a floating installation or an onshore facility, electric power is supplied through a power transmission cable 7. The power transmission cable 7 has three separate conductors or phases (as indicated with the three tilted lines schematically crossing the power transmission cable 7).

The three phase power transmission cable 7 connects to a power conditioning arrangement 100. In this embodiment, the power conditioning arrangement 100 comprises a capacitor arrangement 110 and a transformer 120. To the power conditioning arrangement 100 a DEH cable 3 is connected, which extends along the pipeline 1. The electric power delivered by the power transmission cable 7 can be modified and/or compensated at the subsea location to fit the inductive load of the DEH cable 3 (i.e. the DEH cable and the connected pipeline). That is, in this embodiment the delivered power from the power transmission cable 7 is, in the power conditioning arrangement 100, transformed as a single phase load where the voltage level is decreased (current is increased) and the power factor (cos φ) is adapted to suit an inductive load.

Still referring to FIG. 5, from the power conditioning arrangement 100 a jumper connects to a first connection point 9 to the pipeline 1 (left hand side of FIG. 5). At the opposite end of the pipeline 1 section in question, the DEH cable 3 connects to a second connection point 9, 50 km away. The connection points 9 are arranged in a current transfer zone 11 (CTZ), provided with anodes 13. Between the current transfer zones 11, there are also arranged intermediate anodes 15 for cathodic protection of the pipeline, particularly in case of cracks in the coating/thermal insulation. The intermediate anodes 15 also function as earth points for the pipe. The embodiment shown in FIG. 5 is referred to as an end point fed system, in which the two single-phase terminals are connected to the two opposite ends of a pipe section.

FIG. 6 schematically illustrates another embodiment of the present invention. In this embodiment the midpoint fed system is employed. In this embodiment, two phases are used, one connected to respective ends of a pipeline section of approximately 100 km. The length of the pipeline 1 which is heated with the two phases is thus twice the length heated in the embodiment shown in FIG. 5 (employing the end point fed system). Although not shown in FIG. 6, one could also connect the point in between the two distant connection points 9 to earth (a third conductor to the pipeline midpoint from capacitors on the transformer).

As shown in FIG. 6, two DEH cables 3 extend out from the power conditioning arrangement 100. The DEH cables 3 extend in opposite directions along the pipeline 1 which is to be heated by the DEH assembly. Corresponding to the features of the embodiment shown in FIG. 5, the DEH cables 3 connect to respective connection points 9 (100 km apart) arranged within a current transfer zone 11.

In this embodiment, as shown in FIG. 6, the power conditioning arrangement 100 converts the three phases in the power transmission cable 7 into two phases, of which one is applied on each of the respective DEH cables 3.

In the embodiments shown in FIG. 5 and FIG. 6, the capacitor arrangement 110 will adapt the electric power delivered to the DEH cable(s) 3, as the DEH cable(s) 3, together with the pipeline 1 which shall be heated constitute an inductive load. As a result, less current flows in the power transmission cable 7 and hence a smaller cable with less conductor (copper) cross section can be installed. The needed conductor cross section may be reduced to approximately ½ to ¼ of the cross section of the similar prior art solutions without the subsea capacitor arrangement 110.

FIG. 7 and FIG. 8 schematically show a DEH layout where the pipeline 1 is divided into three heated pipeline sections 1a. In both embodiments electric power is delivered through a 52 kV power transmission cable 7. In the embodiment shown in FIG. 7, a (not indicated) DEH cable 3 extends between two connection points 9 on each side of each of the three pipeline sections 1a. Between each of the three DEH cables 3 and the power transmission cable 7 there is connected a power conditioning arrangement 100 comprising a capacitor arrangement 110 (cf. FIG. 5). In this embodiment, each pipeline section 1a is approximately 50 km long. Thus the illustrated DEH assembly heats a pipeline 1 length of approximately 150 km.

The embodiment shown in FIG. 8 is similar to the one shown in FIG. 7, however a midpoint fed system is employed, such as the one described with reference to FIG. 6 above. Also in this embodiment exhibits three pipeline sections 1a, however since the midpoint fed system is employed each pipeline section 1a can be made longer, such as for instance 50 to 100 km long. Each pipeline section 1a and associated power conditioning arrangement 100 can correspond to the embodiment shown in FIG. 6.

Figure 9:
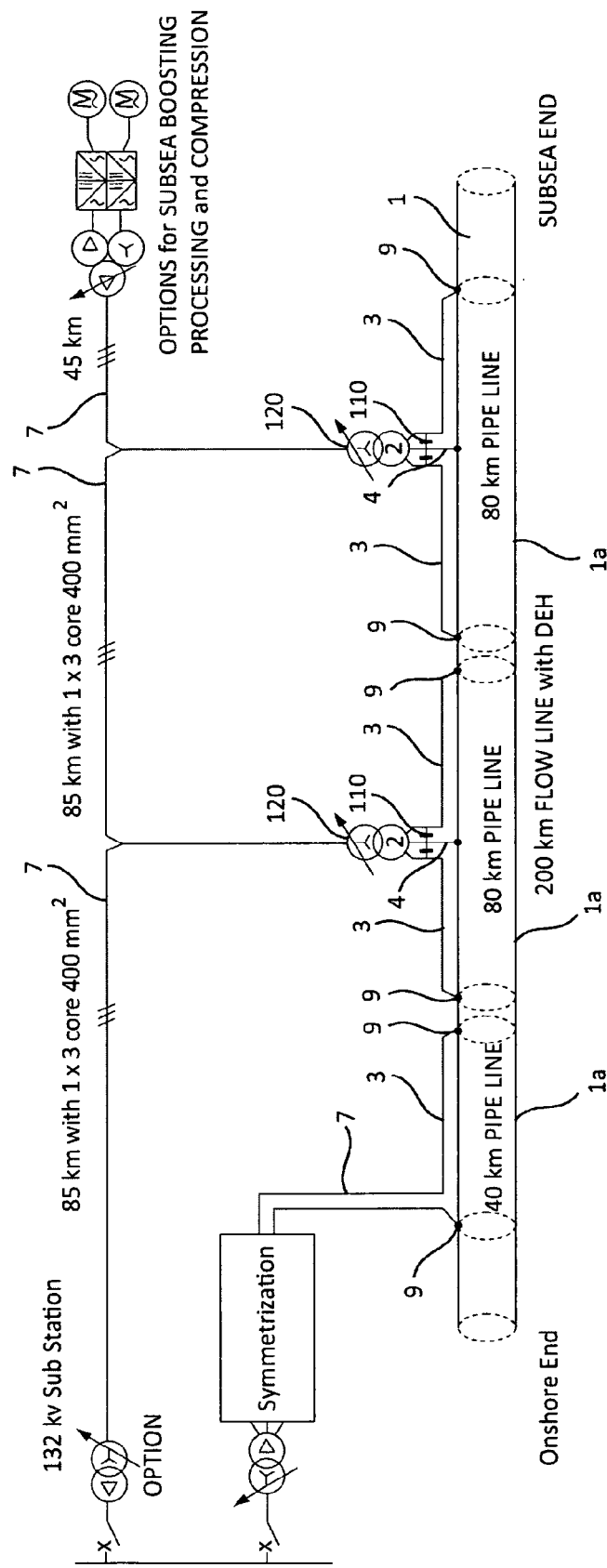
FIG. 9 is a schematic view of a DEH assembly combining end feeding and midpoint feeding.

FIG. 9 shows another embodiment of a DEH assembly according to the present invention. In this embodiment, two pipe sections 1a of 80 km are heated with the midpoint fed system, whereas a third pipe section 1a of 40 km is heated with the endpoint fed system. The endpoint fed pipe section 1a of 40 km is close to a power supply and may be partially above the sea surface. Hence there is no power conditioning arrangement 100 between the typically two-core power transmission cable 7 and the DEH cable 3, associated to this pipeline section 1a. As the pipeline 1 continues a long distance along the seabed, such as to a subsea hydrocarbon well (not shown) the other two pipeline sections are heated with the DEH assembly according to the present invention. Between the three phase power transmission cable 7 and the DEH cables 3 there are arranged, in the subsea location close to the pipeline 1, a power conditioning arrangement 100. In this embodiment, the power conditioning arrangement 100 comprises a three-to-two phase transformer 120. It also comprises a capacitor arrangement 110 with a capacitor element 115 arranged between a section midpoint connection 4 to the pipeline at the mid point between the connection points 9 of the respective pipeline section 1a, and the transformer 120. The transformer 120 provides galvanic segregation between the primary side supplied via the three-phase power transmission cable 7 and the secondary side that is electrically connected to pipeline via the DEH cable 3 and the midpoint connection 4.

As will be explained later, with reference to FIG. 16, the section midpoint connection 4 between the said pipeline section midpoint and the transformer 120, may be connected to the chassis or the outer tank/shell of the transformer 120.

Figure 10:
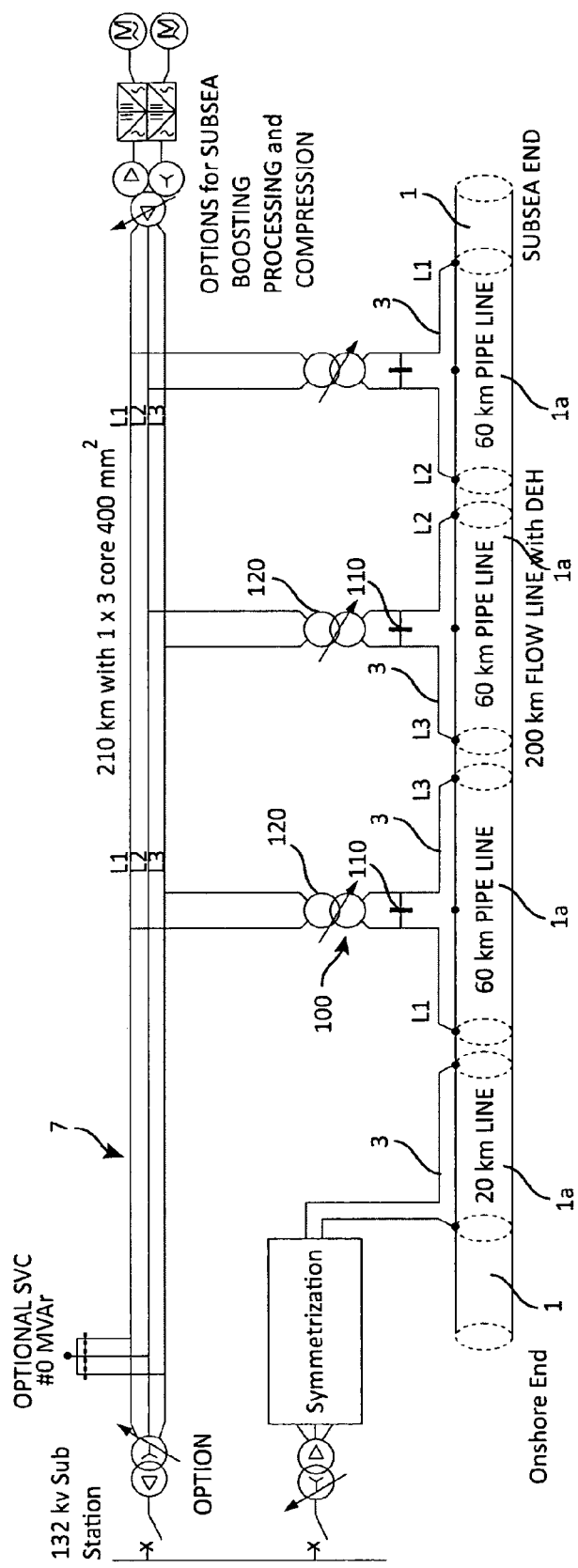
FIG. 10 is schematic view of another DEH assembly combining end feeding and midpoint feeding.

FIG. 10 shows a particular embodiment exhibiting three approximately equally long pipeline sections 1a of 60 km, and a shorter pipeline section of about 20 km. As with the embodiment shown in FIG. 9, a separate short typically two-core power transmission cable 7 extend from an onshore power supply to the short pipeline section 1a of 20 km. For this pipeline section 1a there is no power conditioning arrangement 100 arranged subsea or between the power transmission cable 7 and the DEH cable 3. In association with each of the subsequent three pipeline sections 1a there is however arranged a power conditioning arrangement 100. Furthermore, in this embodiment there is not arranged any section midpoint connection 4 between the transformer 120 and the pipeline 1. In this embodiment, the transformer 120 is a single phase transformer (i.e. a single phase transformer 120 for each power conditioning arrangement 100). The transformer 120 provides galvanic segregation between the primary side supplied via the three-phase power transmission cable 7 and the secondary side that is electrically connected to pipe-line via the DEH cable 3.

In the embodiment illustrated in FIG. 10, the DEH assembly associated with the three longest pipeline sections 1a is coupled to a unique pair of two phases of the three phase power transmission cable 7. That is, the three respective transformers 120 associated with the three long (60 km) pipeline sections 1a are connected to transmission cable phase L1+L3, L2+L3, and L1+L2, respectively. Between each transformer 120 and DEH-cable 3, there is coupled a capacitor arrangement 110. With such coupling layout, one achieves a balanced load on the phases L1, L2, L3 of the power transmission cable 7 when the length or load of each pipe section 1a is the same.

Figure 11:
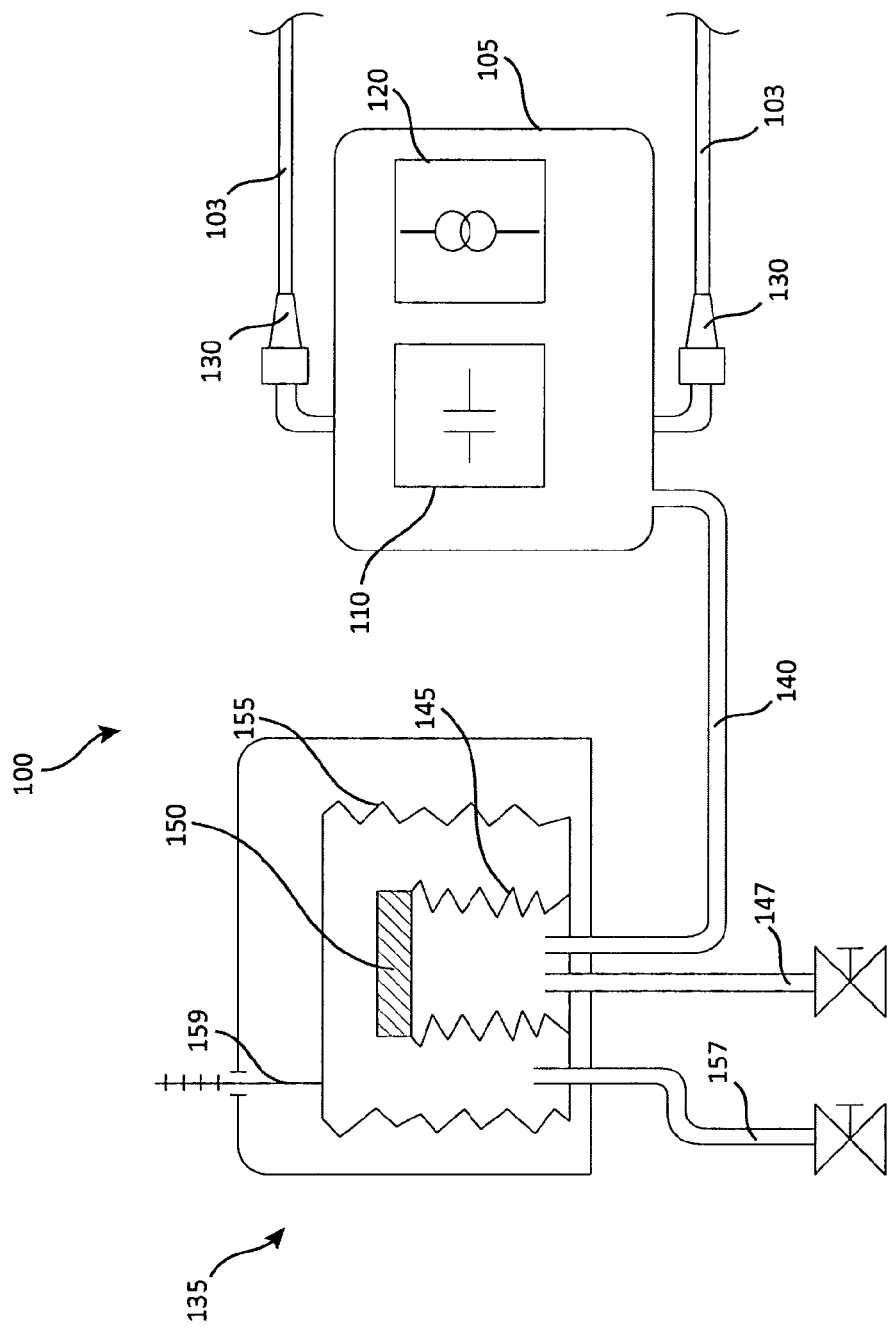
FIG. 11 is a schematic view of a possible power conditioning arrangement being employed with a DEH assembly according to the invention.

FIG. 11 shows a schematic view of a power conditioning arrangement 100, adapted to be installed in a subsea environment. The power conditioning arrangement 100 has a capacitor arrangement 110 arranged within a rigid tank 105. The tank 5 is filled with a liquid, such as an oil. The capacitor arrangement 110 can also have arranged a transformer arrangement 120 within the same tank 105. Electrically connected to the capacitor arrangement 110 and/or the transformer arrangement 120 is a pair of electric cables 103 which connect to a pair of penetrators 130. The electric cables 103 may be connected to the capacitor arrangement 110 by connection to the penetrators 130 in a subsea environment. The power conditioning arrangement 100 can thus be added to an existing electric system subsea and/or may be disconnected for maintenance or replacement. The electric cables 103 may be connected to the DEH cable(s) 3, or may indeed be the DEH cable(s) 3 itself.

In order to make the subsea power conditioning arrangement 100 suitable for installation in a subsea environment, possibly with large ambient pressures, the liquid within the tank 105 is pressure balanced. The pressure balancing is provided with a pressure balancing section 135. The pressure balancing section 135 is functionally connected to the interior of the tank 5 through a pressure balance liquid line 140.

The pressure balance liquid line 140 extends between the interior of the tank 105 and a main metal bellows 145 which can be filled with oil. The main bellows 145 is compressible. Thus when the power conditioning arrangement 100 is lowered into the sea, the ambient pressure will compress the main bellows 145. This results in approximately the same pressure within the main bellows 145 and the tank 105 as the ambient water pressure. In order to provide a slightly larger pressure within the main bellows 145 and the tank 105, a weight 150 is arranged on the main bellows 17 in such way that it preloads or compresses the bellows 145. Thus the pressure in the tank 105 will always be slightly higher than the pressure of the ambient water. This prevents leakage of sea water into the tank 105. In order to render it possible to fill or discharge liquid into or out of the main bellows 145 (such as with an ROV), a connection line and valve 147 is arranged in association to the main bellows 145.

Outside the main bellows 145 there can be arranged an auxiliary bellows 155. The auxiliary bellows 155 encloses the main bellows 145 together with a bottom plate. The auxiliary bellows 155, i.e. the volume between the auxiliary bellows 155 and the main bellows 145 can also be filled with oil or another appropriate barrier liquid. In this way the main bellows 145 is protected from sea water. Corresponding to the main bellows 145, the auxiliary bellows 155 is also provided with a connection line and valve 157. In addition the auxiliary bellows 155 is provided with an indication pin 159 extending upwards from the top of the auxiliary bellows 155. The indication pin 159 indicates the vertical position of the top of the auxiliary bellows 155 and thus tells the operator if liquid amount in the auxiliary bellows 155 needs to be increased or decreased.

As will be appreciated by the person skilled in the art, the pressure balance function is provided also without the auxiliary bellows 155. Also, without the auxiliary bellows 155, the indication pin 159 could be arranged on the main bellows 145.

Surrounding the main bellows 145 and the auxiliary bellows 155 is a rigid enclosure 160 which protects the bellows 145, 155, such as from impacts from falling objects or collision with an ROV.

When employing a power conditioning arrangement 100 in the various embodiments according to the present invention, one may arrange both a capacitor arrangement 110 and a transformer arrangement 120 within the same tank 105. One may also arrange them in separate tanks. However one would then have to connect them together with electric jumpers and additional wet-mate connectors. According to the present invention, there may also be embodiments without transformers (cf. FIG. 17).

Figure 12:
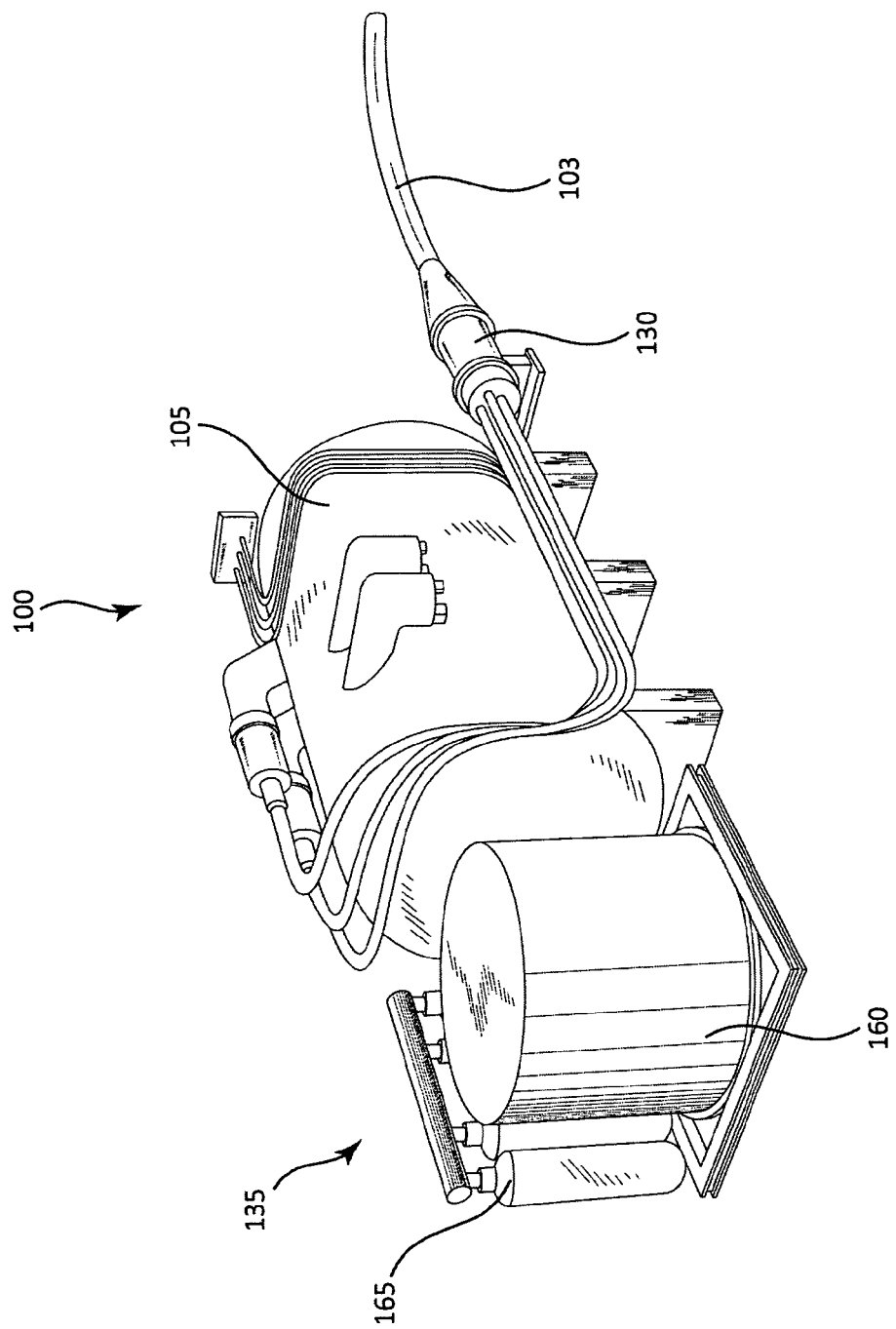
FIG. 12 is a perspective view of the power conditioning arrangement shown in FIG. 11.

FIG. 12 shows a more realistic perspective view of the subsea power conditioning arrangement 100. In this illustration the pressure balancing section 135 also comprises some bladder compensators 165. These are not present in the embodiment shown in FIG. 11. The bladder compensators 165 are connected to the auxiliary bladder 155 in stead of the connection line and valve 157 shown in FIG. 11. Each bladder compensator 165 has a rigid vessel holding a gas volume and a liquid volume, wherein the volumes are separated with a flexible bladder. The liquid line (not shown) extending between the bladder compensators 165 and the interior of the auxiliary bellows 155 can have a valve adapted for filling and/or discharging liquid (e.g. oil) into or out of the bladder compensators 165 and the auxiliary bellows 155.

Figure 14:
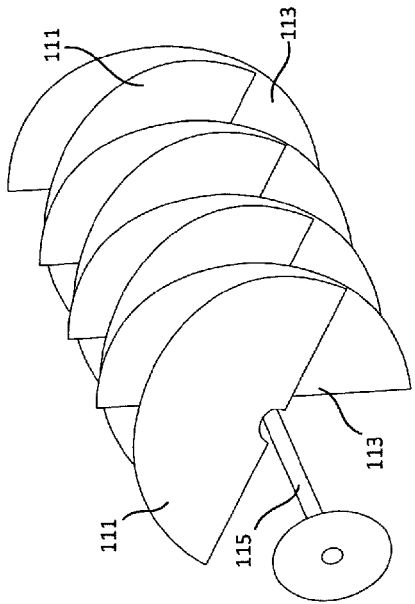
FIG. 14 is a principle perspective view of the variable capacitor element shown in FIG. 13 in an adjusted position.
Figure 15:
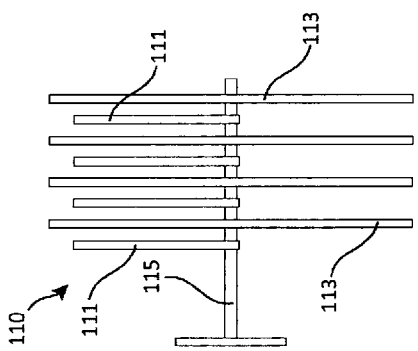
FIG. 15 is a side view of the variable capacitor element shown in FIG. 14.
Figure 13:
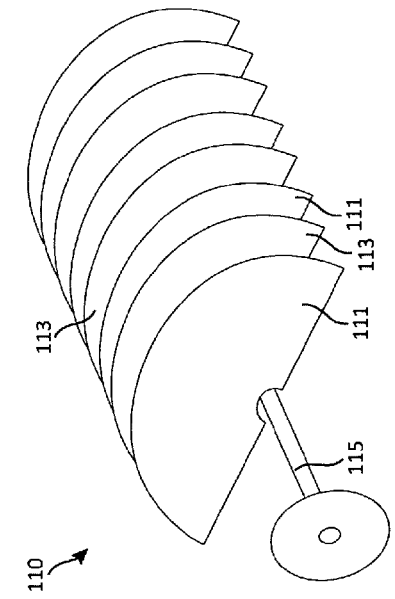
FIG. 13 is a principle perspective view of a variable capacitor element in the power conditioning arrangement shown in FIG. 11.

It is now referred to the drawings of FIG. 13, FIG. 14, and FIG. 15. These drawings show principle sketches of a possible variable capacitor arrangement 110. The capacitor arrangement 110 comprises a set of first plates 111 and a set of second plates 113. As is not shown but will be appreciated to the person skilled in the art, the set of first plates 111 are functionally connected to one of the electric cables 103 whereas the set of second plates 113 are functionally connected to the other electric cable 103 (cf. FIG. 11). Furthermore, the set of second plates 113 is connected to a pivot rod 115 which is adapted to be pivoted by means of an electric actuator (not shown) within the tank 105. When the set of second plates 113 is pivoted with respect to the stationary set of first plates 111, the capacitance varies.

FIG. 13 shows a situation wherein the first plates 111 are aligned with the second plates 113. FIG. 14 shows a situation wherein the second plates 113 have been rotated about 90 degrees with respect to the aligned position shown in FIG. 13. In this position the overlapping area of the first and second plates is less than in the aligned position, thereby reducing the capacitance of the capacitor arrangement 110. With additional rotation of the set of second plates 113, they can be moved into a position in which substantially no overlapping exists between the first and second plates 111, 113. The capacitance of the capacitor arrangement can then be practically zero. FIG. 15 shows the same situation as in FIG. 14, in a side view.

In a more realistic embodiment, the capacitor arrangement 110 will have more plates 111, 113 and the plates can be arranged closer to each other. Furthermore, in stead of having one capacitor element as shown in FIG. 13, the capacitor arrangement 110 can comprise a plurality of capacitor elements, that is a plurality of the assemblies shown in FIG. 13. These can be connected in parallel and some or all of them may be of the variable type. The gaps between the plates 111, 113 can be filled with the liquid, preferably oil, present in the tank 105.

Figure 16:
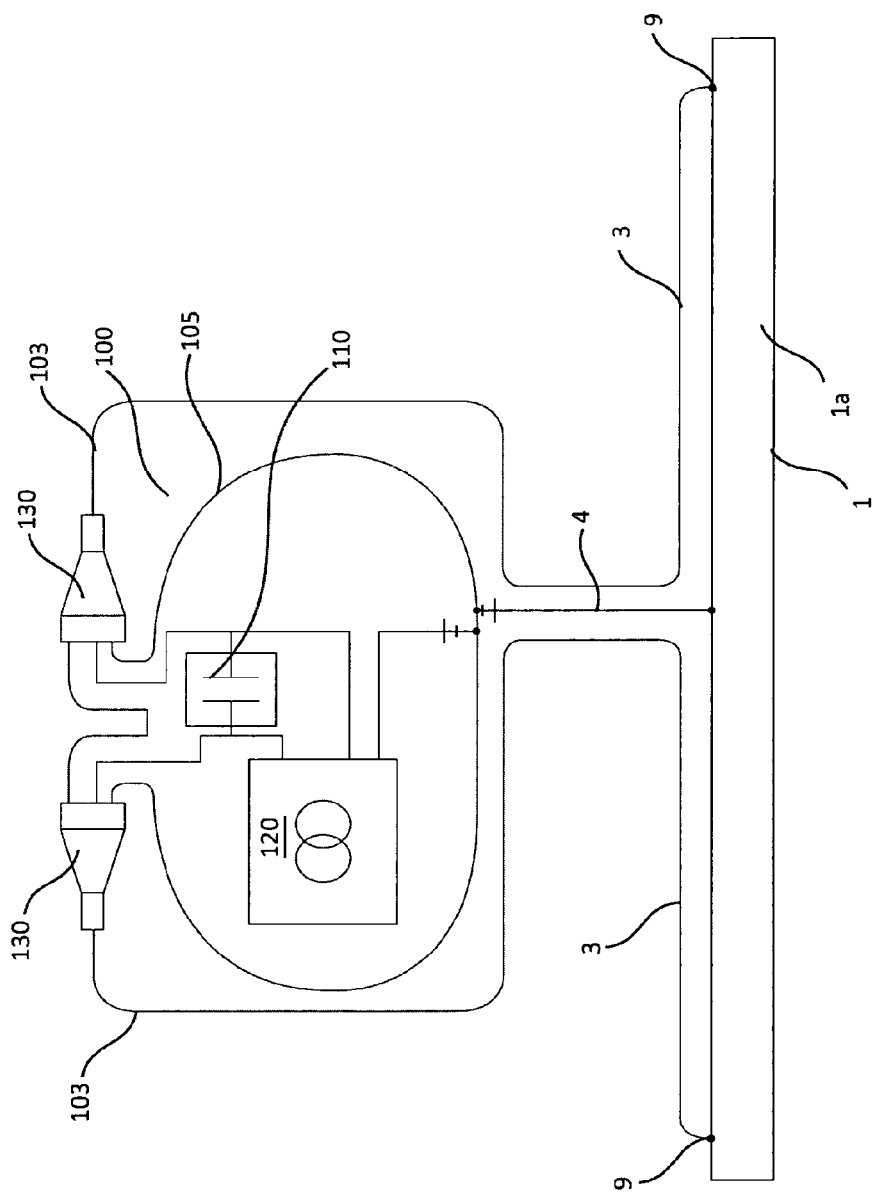
FIG. 16 is a schematic view of an embodiment according to the invention.

FIG. 16 schematically shows the power conditioning arrangement 100 in association to a midpoint fed pipeline 1 or pipeline section 1a. In this embodiment, the power conditioning arrangement 100 comprises a transformer 120 and capacitor arrangement 110. Two of the phases out from the transformer 120 are connected in parallel with the capacitor arrangement 110. After the capacitor arrangement 110, the two phases exit the tank 105 through the penetrators 130. One of the phases is connected to one end of the pipeline section 1a and is terminated to the pipeline 1. In this embodiment, the cable 103 exiting from the penetrator 130 is the same cable as the DEH cable 3 which is piggybacked onto the pipeline 1. The second phase is connected to the other end of the pipeline section 1*b* and is terminated to the pipeline 1. The third phase exiting the transformer 120 is functionally connected to the section midpoint connection cable 4, which connects to the midpoint of the pipeline section 1*b*.

In order to reduce the amount of penetrators and thereby the cost and complexity, the section midpoint connection 4 cable connected to the pipeline section 1*b* is short circuited at the steel structure of the power conditioning arrangement 100, such as on the exterior face of the tank 105. This can be done in different ways. For example by connecting the section midpoint connection 4 cable to a steel sleeve and then welding this steel sleeve to the steel structure of the tank 105. On the inside of the tank 105, the third phase can then be connected to the transformer 120 with a copper cable that is short circuited to the inner side of the tank 105. By doing this there is no need for a cable going through the capacitor assembly and therefore one less penetrator is needed.

As will be appreciated by the person skilled in the art, the power conditioning arrangement 100 is connected to a not shown power transmission cable 7, as shown in the above described embodiments.

Figure 17:
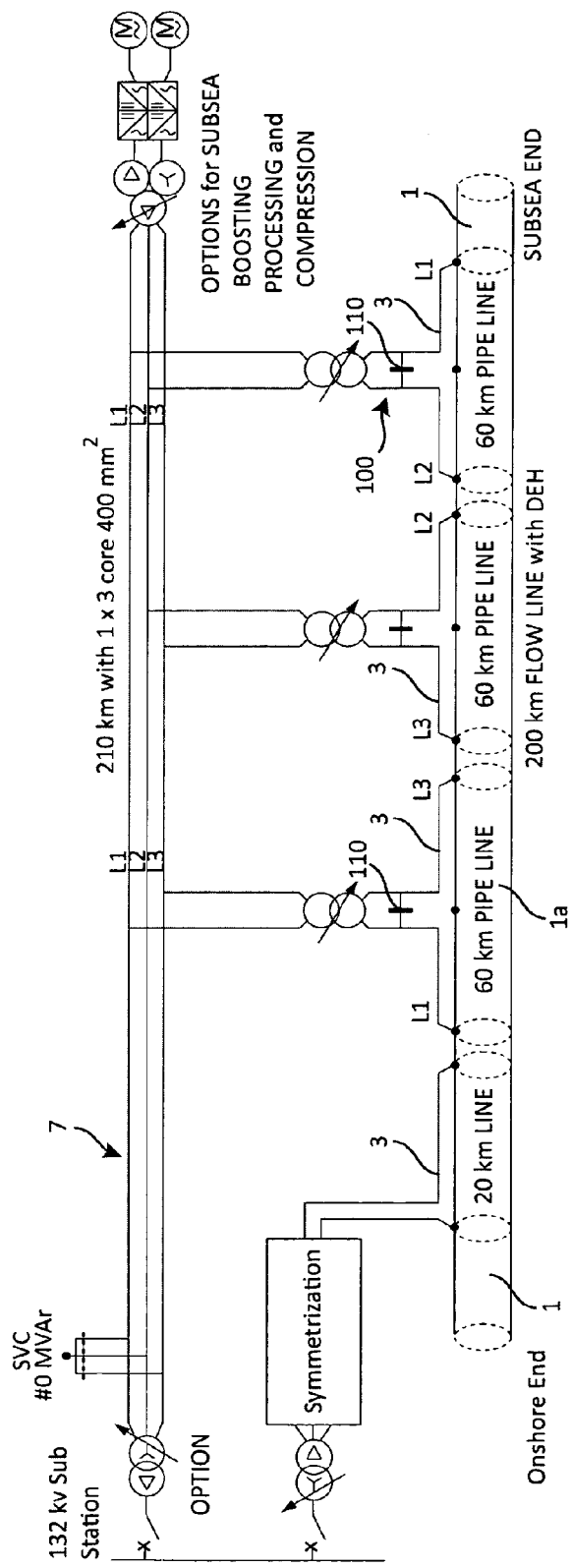
FIG. 17 is schematic view of a DEH assembly according to a further embodiment of the present invention, without a capacitor arrangement.

FIG. 17 shows an additional embodiment of a subsea DEH assembly according to the invention. The embodiment corresponds in many respects to the embodiment described with reference to FIG. 10. However, in the embodiment shown in FIG. 17 the power conditioning arrangement 100 does not comprise a transformer, hence the various sections with DEH do not have galvanic segregation. For the adjacent systems galvanic segregation is provided by the feeding transformers and optionally the receiving transformer in the far-end if installed.

FIG. 18 shows a particular embodiment according to the present invention. On the seabed there are arranged a plurality of different pipelines 3. Each pipeline is arranged with a DEH cable 3. In this embodiment, each pipeline is heated with an endpoint fed system, wherein each respective DEH cable 3 is fed with a common power conditioning arrangement 100. As with the embodiments above, the power conditioning arrangement 100, which is arranged subsea, receives power through a power transmission cable 7.

FIG. 19 is an embodiment similar to the embodiment shown with reference to FIG. 18. However, in the embodiment shown in FIG. 19 each DEH cable 3 is arranged in a configuration to heat a plurality (three) of pipelines 1. That is, each DEH cable 3 is associated with three pipeline segments that extend between the same locations. Moreover, with the embodiment shown in FIG. 19, one power conditioning arrangement 100 provides power to three sets of three DEH cables 3. As will be understood by the person skilled in the art, with the setup shown in FIG. 19 it will be beneficial to have the pipelines 1 close to each other in order to reduce the necessary length of the DEH cables 3 and the jumpers connecting each pipeline (or each pipeline segment 1*a* of different pipelines 1, respectively).

The person skilled in the art will appreciate that the present invention is suited for other embodiments than the ones shown above, such as the pipe-in-pipe technique which is assumed known to the skilled person.

The above described embodiments can typically be employed with pipelines having a diameter in the range of e.g. 20" to 30" and with a length of for instance more than 100 km. As shown by dividing the heated pipeline 1 into sections 1*a*, a pipeline which is much longer than 100 km can be heated.

To illustrate the technical advantages brought about with the present invention, the following example is given. When using the direct electric heating assembly according to the present invention, one can for instance eliminate 2-10 DEH risers (cf. power transmission cable 7 in FIG. 1) extending down from a floating platform (typically for fields with 2-10 heated flowlines), where each riser typically comprises two conductors with a copper cross section of 1200-1600 mm$^2$. All these risers can be replaced with one 3 core riser having three conductors with 200 mm$^2$ to 800 mm$^2$.

The invention claimed is:

1. A subsea direct electrical heating assembly adapted to heat a hydrocarbon conducting steel pipeline arranged subsea, the subsea direct electric heating assembly comprising:
   a direct electrical heating cable extending along and being connected to the steel pipeline and a power transmission cable receiving electric power from a power supply, arranged onshore or at surface offshore, and feeding the direct electrical heating cable;
   a power conditioning arrangement arranged at a subsea location, in a position between the power transmission cable and the direct electrical heating cable;
   wherein the power conditioning arrangement comprises a transformer and a plurality of transformer phases exit the power conditioning arrangement and are connected to the pipeline;
   wherein at least one transformer phase of the plurality of transformer phases is short-circuited to a steel structure of the power conditioning arrangement; and
   wherein the power transmission cable extends from the offshore or onshore power supply and down to the power conditioning arrangement.

2. A subsea direct electrical heating assembly according to claim 1, wherein the power conditioning arrangement comprises a subsea capacitor arrangement.

3. A subsea direct electrical heating assembly according to claim 1, wherein the direct electrical heating cable is arranged along and attached to the pipeline.

4. A subsea direct electrical heating assembly according to claim 1, wherein the subsea direct electrical heating assembly is adapted to heat a plurality of pipeline sections which each constitutes a part of a longer pipeline as the direct electric heating assembly comprises a plurality of direct electric heating cables arranged along and/or in proximity to the pipeline sections and that for each pipeline section a said power conditioning arrangement is arranged between the power transmission cable and the section heating cables associated to each pipeline section.

5. A subsea direct electrical heating assembly according to claim 1, wherein power from said power transmission cable is fed to a direct electrical heating cable adapted to heat a pipeline extending between a subsea well and a compression facility, through the subsea power conditioning arrangement.

6. A subsea direct electrical heating assembly according to claim 2, wherein the subsea capacitor arrangement is in the kV and kVAr range or above, comprising a capacitor element arranged within a tank that prevents sea water entering the tank, wherein the tank is pressure balanced and filled with a pressure compensation fluid.

7. A subsea direct electrical heating assembly according to claim 1, wherein the transformer is arranged within a tank.

8. A subsea direct electrical heating assembly according to claim 6, wherein the capacitor arrangement is a variable capacitor arrangement, the capacitance of which is adjustable between an upper and lower value by means of an actuator arranged within the tank.

9. A subsea direct electrical heating assembly according to claim 1, wherein the transformer is an adjustable transformer.

10. A subsea direct electric heating assembly according to claim 1, wherein the power transmission cable comprises three phases and that three section heating cables are each connected between a different pair of phases.

11. A subsea direct electric heating assembly according to claim 10, comprising three sets of section heating cables, wherein each set comprises two or more section cables.

12. A subsea direct electric heating assembly according to claim 1, wherein the power conditioning arrangement is connected between the power transmission cable and a midpoint fed pipeline section, wherein two transformer phases of the plurality of transformer phases exit the power conditioning arrangement through penetrators and are connected to respective ends of said pipeline section, and that a third transformer phase of the plurality of transformer phases is connected to a section midpoint connection cable that connects to a midpoint on the pipeline section between said respective ends, wherein the section midpoint connection cable is short circuited to the steel structure of the power conditioning arrangement as is also the third transformer phase of the plurality of transformer phases.

13. A subsea direct electric heating assembly according to claim 1, wherein the power transmission cable extends at least 30 km between the power supply and said power conditioning arrangement.

14. A subsea direct electric heating assembly according to claim 1, wherein the power conditioning arrangement is connected to a plurality of DEH cables which are arranged along different pipelines.

15. A subsea direct electric heating assembly according to claim 1, wherein the power conditioning arrangement is connected to a plurality of sets of a plurality of DEH cables, wherein each set is arranged to heat a plurality of parallel pipelines.

* * * * *